United States Patent
Kagimoto et al.

(10) Patent No.: US 10,890,108 B2
(45) Date of Patent: Jan. 12, 2021

(54) EXHAUST GAS BYPASS DEVICE AND SUPERCHARGER

(71) Applicant: MITSUBISHI HEAVY INDUSTRIES ENGINE & TURBOCHARGER, LTD., Sagamihara (JP)

(72) Inventors: Yoshimi Kagimoto, Tokyo (JP);
Noriyuki Hayashi, Tokyo (JP);
Shigeyoshi Umeda, Kanagawa (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 220 days.

(21) Appl. No.: 16/321,691

(22) PCT Filed: Mar. 7, 2017

(86) PCT No.: PCT/JP2017/009094
§ 371 (c)(1),
(2) Date: Jan. 29, 2019

(87) PCT Pub. No.: WO2018/163306
PCT Pub. Date: Sep. 13, 2018

(65) Prior Publication Data
US 2020/0370472 A1    Nov. 26, 2020

(51) Int. Cl.
*F02B 37/18* (2006.01)
*F01D 17/10* (2006.01)
(52) U.S. Cl.
CPC .......... *F02B 37/186* (2013.01); *F01D 17/105* (2013.01); *F05D 2220/40* (2013.01)
(58) Field of Classification Search
CPC ... F02B 37/186; F01D 17/105; F05D 2220/40
See application file for complete search history.

(56) References Cited

U.S. PATENT DOCUMENTS

| 6,883,317 B2* | 4/2005 | Heath | F02D 23/005 |
| | | | 60/602 |
| 7,677,040 B2* | 3/2010 | McEwan | F01D 17/105 |
| | | | 60/602 |

(Continued)

FOREIGN PATENT DOCUMENTS

| DE | 102011007279 A1 | 10/2012 |
| JP | 2014-521865 A | 8/2014 |

(Continued)

OTHER PUBLICATIONS

Written Opinion of the International Searching Authority (Form PCT/ISA/237), dated Jun. 6, 2017, for International Application No. PCT/JP2017/009094, with an English translation.

(Continued)

*Primary Examiner* — Jesse S Bogue
(74) *Attorney, Agent, or Firm* — Birch, Stewart, Kolasch & Birch, LLP.

(57) ABSTRACT

This exhaust gas bypass device and supercharger are provided with: an actuator (31) for moving a driving rod (41) reciprocally in the axial direction of the driving rod; a coupling rod (32) coupled to the tip section of the driving rod (41); a support shaft (34) rotatably supported on a housing; a coupling link (33), one end section of which is rotatably coupled to the tip section of the coupling rod (32) via a coupling shaft (45) and the other end section of which is fixed to the one end section of the support shaft (34); a waste gate valve (35) coupled to the other end section of the support shaft (34); and a damping member for damping displacement between the coupling rod (32) and the coupling link (33), whereby reliability is improved by ensuring desirable operative characteristics.

15 Claims, 4 Drawing Sheets

(56) References Cited

U.S. PATENT DOCUMENTS

| | | | |
|---|---|---|---|
| 8,701,408 B2* | 4/2014 | Dettmann | F01D 17/105 60/602 |
| 9,234,455 B2* | 1/2016 | Fauconnier | F02B 37/186 |
| 9,896,993 B2* | 2/2018 | Dilalan | F16C 11/08 |
| 10,487,725 B2* | 11/2019 | Takahashi | F02B 37/186 |
| 10,550,760 B2* | 2/2020 | Marques | F01D 25/24 |
| 2007/0271917 A1* | 11/2007 | Vogt | F02B 37/183 60/600 |
| 2013/0139502 A1 | 6/2013 | Chu | |
| 2013/0333379 A1 | 12/2013 | Hinkelmann et al. | |
| 2014/0127004 A1 | 5/2014 | Schaeflein et al. | |
| 2014/0140831 A1 | 5/2014 | Tschirschke | |
| 2015/0377119 A1 | 12/2015 | Niedens et al. | |
| 2017/0145911 A1 | 5/2017 | Takahashi et al. | |

FOREIGN PATENT DOCUMENTS

| | | |
|---|---|---|
| JP | 2016-14391 A | 1/2016 |
| WO | WO 2016/031565 A1 | 3/2016 |

OTHER PUBLICATIONS

Extended European Search Report for European Application No. 17899656.7, dated Aug. 1, 2019.

\* cited by examiner

EXHAUST GAS BYPASS DEVICE AND SUPERCHARGER

TECHNICAL FIELD

The present invention relates to an exhaust gas bypass device which bypasses an exhaust gas discharged from an engine without causing the exhaust gas to flow to a turbine and a turbocharger having the exhaust gas bypass device.

BACKGROUND ART

A turbocharger is configured such that a compressor and a turbine are connected to each other so as to be integrally rotated with each other by a rotating shaft. In the turbocharger, the turbine is rotated by an exhaust gas flowing through an exhaust passage, a rotation of the turbine is transmitted to the rotating shaft to rotate the compressor, and the compressor compresses air and supplies the compressed air from an intake passage to an engine. In the turbocharger, an exhaust gas bypass device (waste gate valve) which bypasses the turbine from the exhaust passage on an upstream side of the turbine is provided. When an amount of exhaust gas of the engine is excessive, the exhaust gas is discharged without being supplied to the turbine by opening the waste gate valve, overboosting of a boost pressure caused by an increase in a rotation of the turbine is prevented, an operating point of an exhaust gas flow rate at the time of a low load increases, and a high output of the engine is obtained.

The exhaust gas bypass device applied to the turbocharger is configured to open or close the waste gate valve by an actuator including a pneumatic bellows and a spring, and if supply of a working fluid to the bellows is stopped, the waste gate valve closes a bypass passage by a spring force of a spring member, and if the working fluid is supplied, the waste gate valve is operated against the spring force of the spring member so as to open the bypass passage. For example, as the exhaust gas bypass device, there is an exhaust gas bypass device disclosed in PTL 1.

CITATION LIST

Patent Literature

[PTL 1] Japanese Unexamined Patent Application Publication No. 2016-014391

SUMMARY OF INVENTION

Technical Problem

Meanwhile, in general, although the waste gate valve is movable to a position at which the bypass passage is closed and a position at which the bypass passage is opened, it is desirable to finely adjust the flow rate of the exhaust gas supplied to the turbine by stopping the waste gate valve at a position between the closing position and the opening position. However, since the actuator is operated by an intake pressure on a downstream side of the compressor, the intake pressure is changed due to exhaust pulsation of the engine. Therefore, not only it is difficult to stop the waste gate valve at a desired position, but also vibrations which excessively repeatedly open or close the waste gate valve alternately are generated, which wears a driving link portion.

The present invention is made so as to solve the above-described problems, and an object thereof is to provide an exhaust gas bypass device and a turbocharger which can improve reliability by ensuring desirable operability.

Solution to Problem

In order to achieve the above-described object, according to an aspect of the present invention, there is provided an exhaust gas bypass device including: an actuator which reciprocates a driving rod in the axial direction; a connection rod which is connected to a distal end portion of the driving rod; a support shaft which is rotatably supported by a support tube; a connection link whose one end portion is rotatably connected to a distal end of the connection rod via a connection shaft and the other end portion is fixed to one end portion of the support shaft; a waste gate valve which is connected to the other end portion of the support shaft; and a damping member which attenuates a displacement between the connection rod and the connection link.

Accordingly, if the driving rod of the actuator is driven, a driving force is transmitted to the connection link via the connection rod, the connection link and the support shaft are integrally rotated with each other, and the waste gate valve is opened and closed. In this case, the damping member attenuates a displacement between the connection rod and the connection link. Accordingly, an occurrence of wear in a rotating portion between the connection rod and the connection link or a rotating portion of the support shaft is suppressed, and thus, and it is possible to improve reliability by ensuring desirable operability.

In the exhaust gas bypass device of the present invention, the damping member is an extension portion of the connection link in a longitudinal direction of the connection rod.

Accordingly, since the damping member is the extension portion of the connection link in the longitudinal direction of the connection rod, the connection rod and the extension portion of the connection link are in sliding-contact with each other, and thus, the displacement between the connection rod and the connection link is attenuated, and it is possible to easily suppress the occurrence of the wear in the rotating portion by a simple configuration.

In the exhaust gas bypass device of the present invention, a first length of a connection portion between the connection link and the connection rod in a longitudinal direction of the connection rod is set to be longer than a second length of a fixed portion between the connection link and the support shaft in the longitudinal direction of the connection rod.

Accordingly, since the first length of the connection portion between the connection link and the connection rod is lengthened, a sliding contact between the connection rod and the connection link occurs at a position far from a center of the connection shaft. Therefore, a frictional force generated at the sliding contact portion acts as a large moment in a rotation restriction direction, and thus, the displacement between the connection rod and the connection link is attenuated, and it is possible to easily suppress the occurrence of the wear in the rotating portion by a simple configuration.

In the exhaust gas bypass device of the present invention, when an axial length of the support tube is defined as $L3$, a radial gap between an outer peripheral surface of the support shaft and an inner surface of the support tube is defined as $d$, an axial gap of the connection shaft between the connection link and the connection rod is defined as $S$, and a length of the connection link from a center position of the connection shaft to an end portion in a longitudinal direction of the connection rod is defined as $L1$, $d/L3 > S/L1$ is satisfied.

Accordingly, the length L3 of the support tube, the radial gap d between the support shaft and the support tube, the axial gap S between the connection link and the connection rod, and the length L1 from the center position of the connection shaft to the end portion of the connection link are set to appropriate dimensions, and thus, the connection link is inclined with respect to the connection rod, the connection rod and the connection link can be into sliding-contact with each other in an appropriate manner, the displacement between the connection rod and the connection link is attenuated, and it is possible to suppress the occurrence of the wear in the rotating portion.

In the exhaust gas bypass device of the present invention, the damping member is a biasing member which is interposed between the connection link and the connection rod and presses the connection link and the connection rod.

Accordingly, when the connection rod, the connection link, and the support shaft relatively move to each other, the biasing member is in sliding-contact with the connection rod and the connection link, and thus, the displacement between the connection rod and the connection link is attenuated, and it is possible to easily suppress the occurrence of the wear in the rotating portion by a simple configuration.

In the exhaust gas bypass device of the present invention, the damping member is a biasing member which is fixed to a flat surface portion of the connection link on a side opposite to the connection rod and presses the connection rod.

Accordingly, when the connection rod, the connection link, and the support shaft relatively move to each other, the biasing member is in sliding-contact with the connection rod and the connection link, and thus, the displacement between the connection rod and the connection link is attenuated, and it is possible to easily suppress the occurrence of the wear in the rotating portion by a simple configuration.

In the exhaust gas bypass device of the present invention, the connection shaft passes through the connection link and the connection rod, a flange section for retaining is fixed to one end portion in an axial direction of the connection shaft, and a detachable locking member is mounted on the other end portion in the axial direction of the connection shaft.

Accordingly, the assembly between the connection link and the connection rod is performed by the flange section for retaining and the detachable locking member, and thus, it is possible to easily assemble the connection link and the connection rod.

In addition, according to another aspect of the present invention, there is provided a turbocharger including: a compressor; a turbine; a rotating shaft which coaxially connects the compressor and the turbine to each other; and the exhaust gas bypass device.

Accordingly, when the exhaust gas bypass device is operated, the damping member attenuates the displacement between the connection rod and the connection link, and thus, the occurrence of the wear in the rotating portion between the connection rod and the connection link or the rotating portion of the support shaft is suppressed, and thus, and it is possible to improve reliability by ensuring desirable operability.

Advantageous Effects of Invention

According to the exhaust gas bypass device and the turbocharger of the present invention, it is possible to improve reliability by ensuring desirable operability.

DESCRIPTION OF EMBODIMENTS

Hereinafter, preferred embodiments of an exhaust gas bypass device and a turbocharger according to the present invention will be described in detail with reference to the accompanying drawings. In addition, the present invention is not limited by the embodiments, and in a case where a plurality of embodiments are provided, the present invention includes a combination of the embodiments.

First Embodiment

Figure 1:
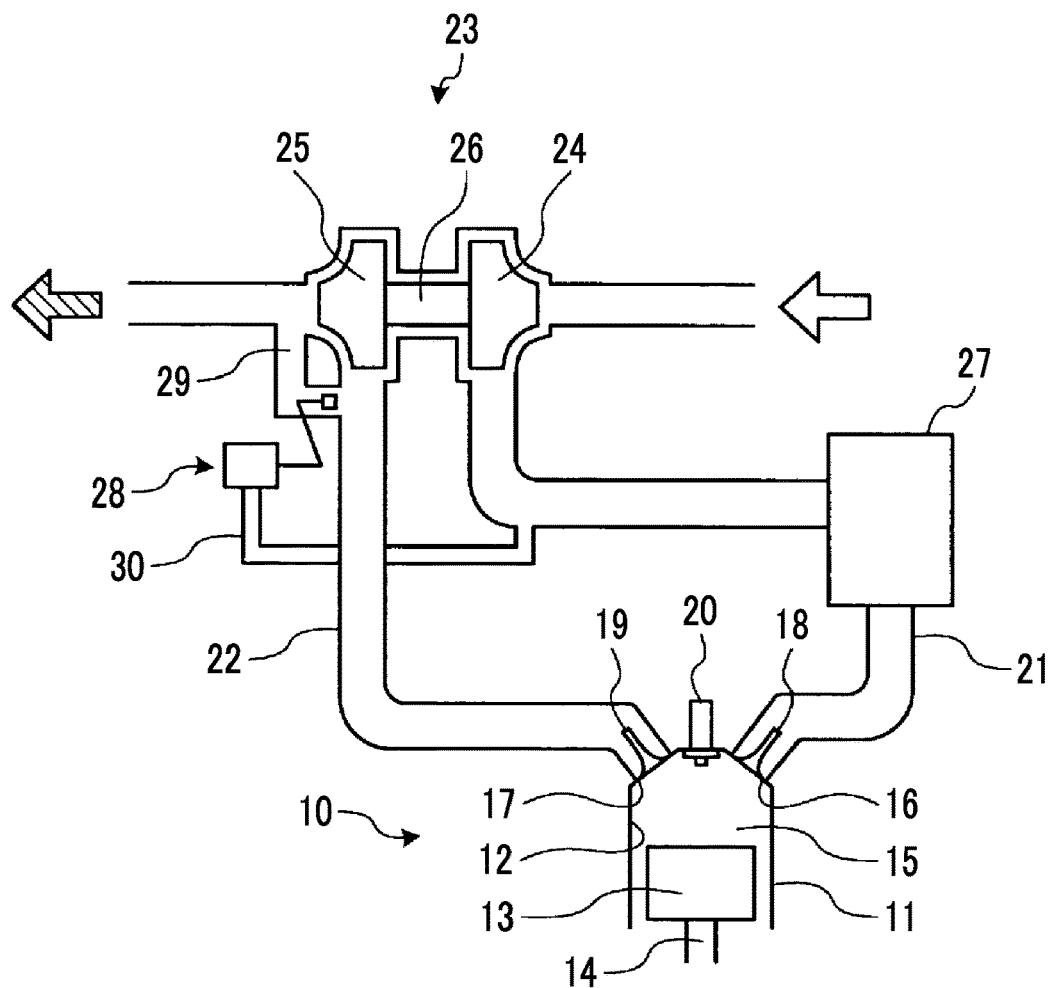
FIG. 1 is a schematic configuration view showing an engine to which an exhaust gas bypass device according to a first embodiment is applied.

FIG. 1 is a schematic configuration view showing an engine to which an exhaust gas bypass device according to a first embodiment is applied.

In the first embodiment, as shown in FIG. 1, an engine 10 is a multi-cylinder internal combustion engine. In an engine body 11 is configured such that a cylinder head is fastened to a cylinder block, a plurality of cylinder bores 12 are provided, and a piston 13 is supported by each cylinder bore 12 via a cylinder liner (not shown) so as to be movable up and down. Although not shown, a crank shaft is rotatably supported on a lower portion of the engine body 11, and each piston 13 is connected to the crank shaft via a connecting rod 14.

A combustion chamber 15 is configured to be defined by a wall surface and a lower surface of the cylinder bore 12 and a top surface of the piston 13. An intake port 16 and an exhaust port 17 are formed to be arranged on an upper portion of the combustion chamber 15, that is, the engine body 11, and lower end portions of an intake valve 18 and an exhaust valve 19 are respectively positioned in the intake port 16 and the exhaust port 17. The intake valve 18 and the exhaust valve 19 are supported by the engine body 11 to be movable along an axial direction and is biased and supported in a direction (upper side in FIG. 1) which closes the intake port 16 and the exhaust port 17. An intake cam and an exhaust cam of an intake cam shaft and an exhaust cam shaft (all is not shown) act on the intake valve 18 and the exhaust valve 19, and thus, the intake port 16 and the exhaust port 17 can be opened and closed. In addition, a fuel injection valve 20 is provided on an upper portion of the combustion chamber 15, that is, the engine body 11. The fuel injection valve 20 can inject a high-pressure fuel to the combustion chamber 15.

Accordingly, in the engine 10, four strokes such as an intake stroke, a compression stroke, an expansion stroke, and an exhaust stroke are performed while the crank shaft is rotated twice, and in this case, the intake cam shaft and the exhaust cam shaft rotate once, and the intake valve 18 and the exhaust valve 19 open and close the intake port 16 and the exhaust port 17.

In the engine body 11, an intake passage 21 is connected to the intake port 16 and an exhaust passage 22 is connected to the exhaust port 17. A turbocharger 23 is configured such that a compressor 24 and a turbine 25 are connected to each other so as to be integrally rotated with each other by the rotating shaft 26. In the turbocharger 23, the turbine 25 is rotated by an exhaust gas flowing through the exhaust passage 22 of the engine body 11, the rotation of the turbine 25 is transmitted by the rotating shaft 26 so as to rotate the compressor 24, and the compressor 24 compresses air so as to supply the compressed air from the intake passage 21 to the engine body 11. In addition, an intercooler 27 is mounted on the intake passage 21.

In the exhaust passage 22, an exhaust gas bypass device 28 is provided so as to correspond to a mounting position of the turbine 25. The exhaust passage 22 includes a bypass passage 29 which branches off from an upstream-side position of the turbine 25 in a flow direction of the exhaust gas and is connected to a downstream-side position of the turbine 25 in the flow direction of the exhaust gas. One end portion of an operating passage 30 is connected to between the compressor 24 and the intercooler 27 in the intake passage 21, and the other end portion of the operating passage 30 is connected to an actuator of the exhaust gas bypass device 28. In addition, although not shown, a three-way solenoid valve is provided in the operating passage 30, and the three-way solenoid valve alternately switches a time during which the actuator and the intake passage 21 communicate with each other and a time during which the actuator and the atmosphere communicate with each other and can set a pressure inside the actuator to a predetermined pressure between the intake pressure and the atmospheric pressure by changing a ratio between the times. Accordingly, the exhaust gas bypass device 28 opens or closes the bypass passage 29 by the intake pressure in the intake passage 21, and thus, it is possible to adjust an amount of the exhaust gas bypassing the turbine 25, that is, an amount of the exhaust gas supplied to be supplied to the turbine 25.

Therefore, in the engine body 11, if air is supplied from the intake passage 21 to the combustion chamber 15, the air is compressed by ascending of the piston 13, and if a high-pressure fuel is injected from the fuel injection valve 20 to the combustion chamber 15, the high-pressure fuel is ignited and combusted. In addition, a generated combustion gas is discharged to the exhaust passage 22 as the exhaust gas. The exhaust gas discharged from the combustion chamber 15 rotates the turbine 25 in the turbocharger 23, rotates the compressor 24 via the rotating shaft 26, and performs turbocharging on the combustion chamber 15. In addition, if the bypass passage 29 is opened by the exhaust gas bypass device 28, the exhaust gas passes through the bypass passage 29 so as to bypass the turbine 25.

Figure 2:
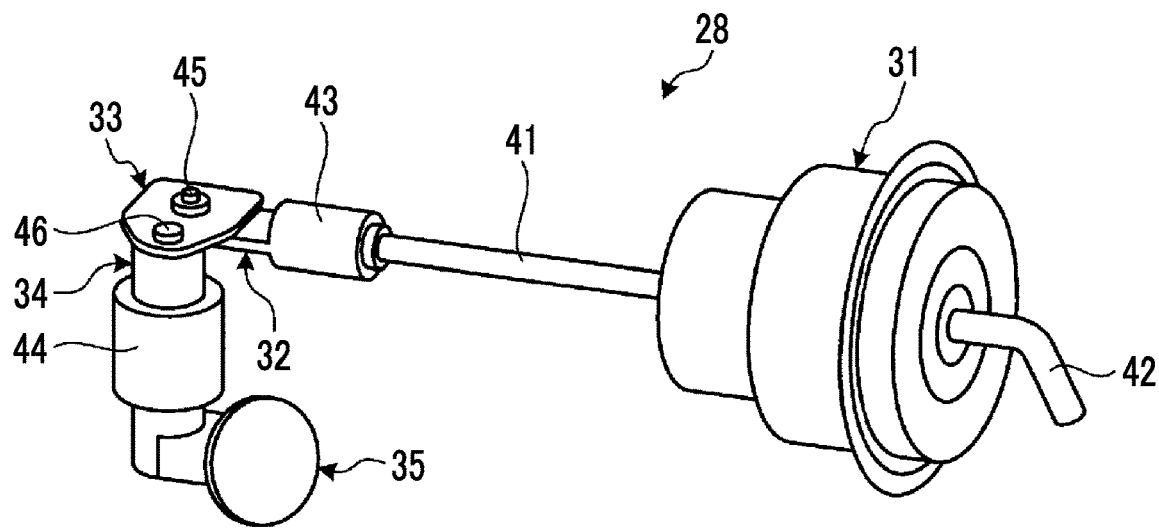
FIG. 2 is a perspective view showing the entire configuration of the exhaust gas bypass device.

Here, the exhaust gas bypass device 28 will be described. FIG. 2 is a perspective view showing the entire configuration of the exhaust gas bypass device.

As shown in FIG. 2, the exhaust gas bypass device 28 includes an actuator 31, a connection rod 32, a connection link 33, a support shaft 34, and a waste gate valve 35.

The actuator 31 reciprocates a driving rod 41 in an axial direction according to the intake pressure. Although not shown, the inside of the actuator 31 is partitioned into two chambers by a gate valve, and a proximal end portion of the driving rod 41 is connected to the gate valve. The gate valve is biased in a direction (right direction in FIG. 2) in which the driving rod 41 is retracted by a biasing force of a spring accommodated in one chamber. In addition, an operating tube 42 (operating passage 30) applying the intake pressure is connected to the other chamber. Accordingly, the actuator 31 stops at a position at which the driving rod 41 is retracted by the biasing force of the spring acting on the gate valve. In addition, if the intake pressure acts on the other chamber through the operating tube 42, the gate valve moves against the biasing force of the spring, and the driving rod 41 integral with the gate valve moves in a protrusion direction.

One end portion of the connection rod 32 is connected to a distal end portion of the driving rod 41 via a turn buckle 43. The turn buckle 43 connects the driving rod 41 and the connection rod 32 to each other in series in a straight line direction. The connection rod 32 has a plate shape long in a movement direction thereof.

The support shaft 34 has a cylindrical shape and is rotatably supported by a support tube 44 fixed to a housing (not shown). In this case, axial directions of the driving rod 41 and the connection rod 32 are substantially orthogonal to an axial direction of the support shaft 34. In addition, without providing the support tube 44 separately from the housing, the housing and the support tube 44 may be integrally provided with each other such that the support shaft 34 may be rotatably supported on the housing directly.

The connection link 33 has a plate shape with a predetermined thickness, and one end portion thereof is rotatably connected to the other end portion of the connection rod 32 by a connection shaft 45. In addition, the other end portion of the connection link 33 is fixed to one end portion of the support shaft 34 by a connection pin 46. In this case, the connection pin 46 extends coaxially from one end portion of the support shaft 34, and an outer diameter of the connection pin 46 is smaller than that of an outer shape of the support shaft 34. The other end portion of the connection link 33 is fixed to the connection pin 46, and thus, is integrally rotated with the support shaft 34. Moreover, the waste gate valve 35 is fixed to the other end portion of the support shaft 34.

Therefore, if the actuator 31 is operated, the driving rod 41 moves in the protruding axial direction, and the connection rod 32 moves in the same direction via the turn buckle 43. If the connection rod 32 moves in a longitudinal direction, the connection rod 32 and the connection link 33 relatively move to each other, and the connection link 33 rotates together with the support shaft 34. If the support shaft 34 rotates, the waste gate valve 35 integrated with the support shaft 34 moves from a closing position to an opening position.

Figure 3:
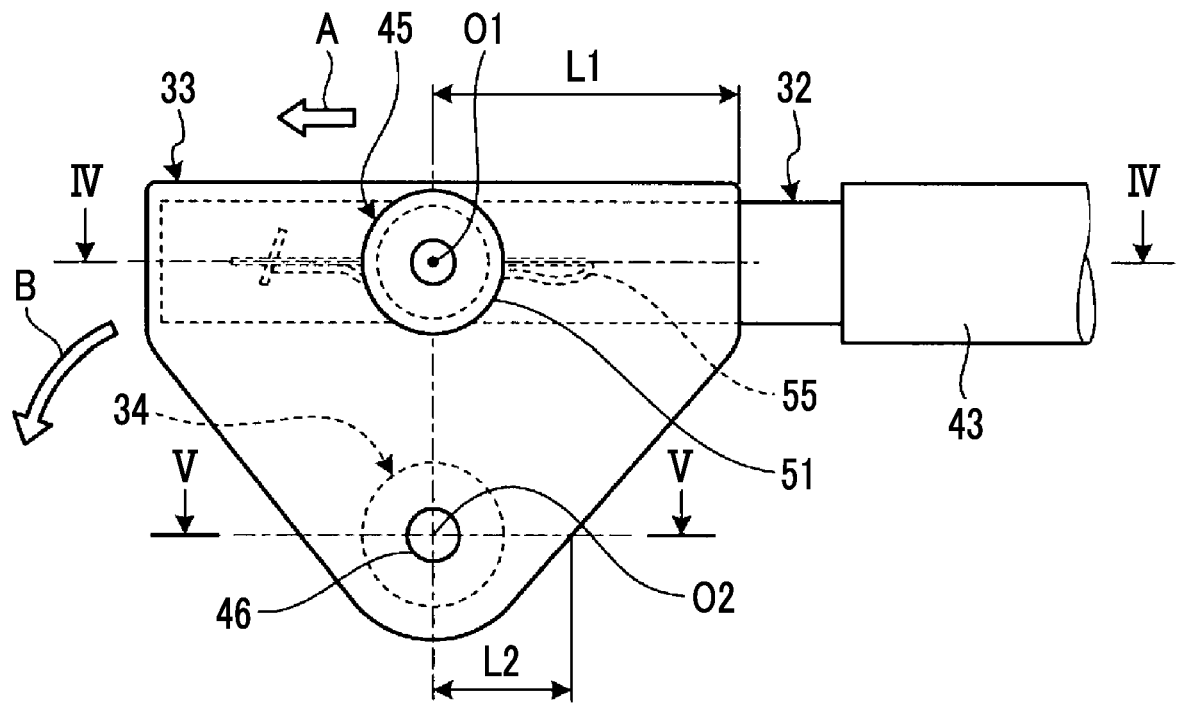
FIG. 3 is a plan view showing a connection structure of a connection link in the exhaust gas bypass device.

The exhaust gas bypass device 28 of the present embodiment includes a damping member for attenuating a displacement between the connection rod 32 and the connection link 33. FIG. 3 is a plan view showing a connection structure of the connection link in the exhaust gas bypass device, FIG. 4 is a sectional view taken along line IV-IV of FIG. 3, and FIG. 5 is a sectional view taken along line V-V of FIG. 3.

Figure 4:
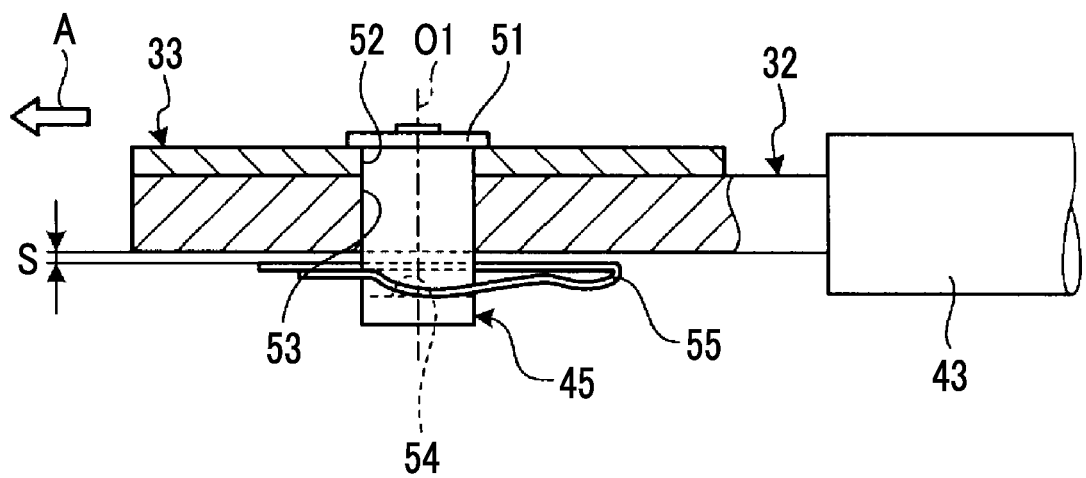
FIG. 4 is a sectional view taken along line IV-IV of FIG. 3.
Figure 5:
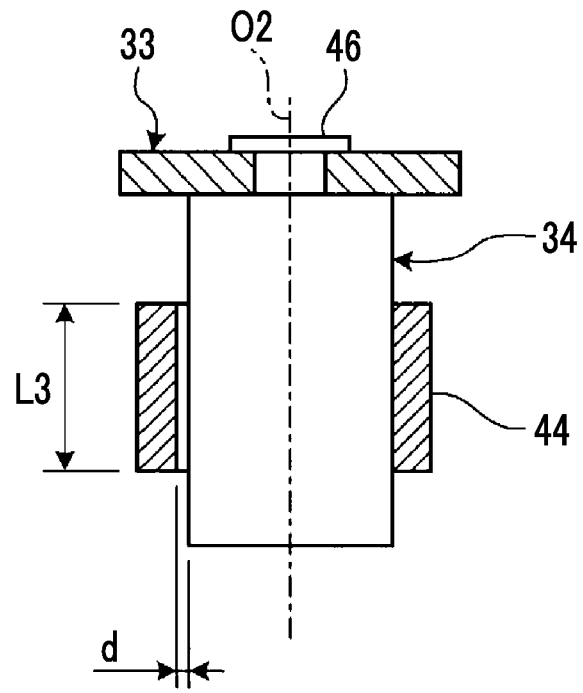
FIG. 5 is a sectional view taken along line V-V of FIG. 3.

As shown in FIGS. 3 to 5, the connection rod 32 has a predetermined plate thickness and has a rectangular plate shape which is long in a movement direction (the axial direction of the driving rod 41) in a plan view. The connection link 33 has a plate thickness thinner than that of the connection rod 32 and has a triangular plate shape in a plan view. In the connection link 33, a first length L1 of a connection portion (connection shaft 45) between the connection rod 32 and the connection link 33 in the longitudinal direction of the connection rod 32 is set to be longer than a second length L2 of a fixed portion between the support shaft 34 (connection pin 46) and the connection link 33 in the longitudinal direction of the connection rod 32.

In general, the connection link is set such that the first length L1 is shorter than the second length L2 or the first length L1 and the second length L2 are the same as each other. In the present embodiment, in the connection link 33, by lengthening the first length L1 of the connection portion (connection shaft 45) between the connection rod 32 and the connection link 33, the elongated portion functions as an extension portion. That is, an overlapping area of the connection rod 32 and the connection link 33 increases.

In addition, the connection shaft 45 is integrally formed with a flange section 51 which has a disk shape larger than an outer diameter of the connection shaft 45 at one axial end. The connection shaft 45 passes through an attachment hole 52 formed in the connection link 33 and passes through the connection hole 53 formed in the connection rod 32. In addition, in the connection shaft 45, a locking hole 54 which penetrates in a radial direction at the other end portion of the connection shaft 45 is formed, and a locking pin (locking member) 55 is removably inserted into the locking hole 54. Therefore, the connection shaft 45 passes through the connection link 33 and the connection rod 32 in a state where the connection link 33 and the connection rod 32 overlap each other, the flange section 51 is formed on the end portion of the connection shaft 45 on the connection link 33 side, the locking pin 55 is mounted on the end portion of the connection shaft 45 on the connection rod 32 side, and thus, the connection shaft 45 is assembled to be detachable.

In this case, when an axial thickness of the support tube 44 on which the support shaft 34 is supported is defined as L3, a radial gap between an outer peripheral surface of the support shaft 34 and an inner peripheral surface of the support tube 44 is defined as d, an axial gap of the connection shaft 45 between the connection link 33 and the connection rod 32 is defined as S, and the length of the connection link 33 from a center position O1 of the connection shaft 45 to the end portion in the longitudinal direction of the connection rod 32 is defined as L1, the following relationship is set. In this case, the radial gap d is a radial displacement amount between the support shaft 34 and the support tube 44. In addition, the axial gap S is a displacement amount in the axial direction of the connection shaft 45 between the connection link 33 and the connection rod 32, and in FIG. 4, it is represented as the axial gap S between the connection rod 32 and the locking pin 55.

$$d/L3 > S/L1$$

Therefore, if the connection rod 32 moves in a direction of an arrow A, the connection link 33 rotates in a direction of an arrow B (the counterclockwise direction in FIG. 3) about a center position O2 of the support shaft 34. In this case, since the radial gap d and the axial gap S are set, the support shaft 34 is inclined with respect to the support tube 44, and the end portion (the extension portion) of the connection link 33 is in sliding-contact with of a flat surface portion of the connection rod 32. As a result, a frictional resistance is generated between the connection rod 32 and the connection link 33, and a relative displacement between the connection rod 32 and the connection link 33 is attenuated. Therefore, an occurrence of wear between the connection rod 32, the connection link 33, and the connection shaft 45, and between the support shaft 34 and the support tube 44 is suppressed. In this case, since the first length L1 of the connection link 33 is secured sufficiently long, an amplitude when the connection rod 32 and the connection link 33 resonate with each other decreases.

In this way, the exhaust gas bypass device of the first embodiment includes the actuator 31 which reciprocates the driving rod 41 in the axial direction, the connection rod 32 which is connected to the distal end portion of the driving rod 41, the support shaft 34 which is rotatably supported by the housing, the connection link 33 whose one end portion is rotatably connected to the distal end portion of the connection rod 32 via the connection shaft 45 and the other end portion is fixed to the one end portion of the support shaft 34, the waste gate valve 35 which is connected to the other end portion of the support shaft 34, and the damping member which attenuates the displacement between the connection rod 32 and the connection link 33.

Accordingly, if the driving rod 41 of the actuator 31 is driven, the driving force is transmitted to the connection link 33 via the connection rod 32, the connection link 33 and the support shaft 34 are integrally rotated with each other, and the waste gate valve 35 is opened and closed. In this case, the damping member attenuates the displacement between the connection rod 32 and the connection link 33. Accordingly, an occurrence of wear in a rotating portion between the connection rod 32 and the connection link 33 or a rotating portion of the support shaft 34 is suppressed, and thus, it is possible to accurately set opening and closing positions of the waste gate valve 35, and it is possible to improve reliability by ensuring desirable operability.

In the exhaust gas bypass device of the first embodiment, the extension portion of the connection link 33 in the longitudinal direction of the connection rod 32 is the damping member. Accordingly, the connection rod 32 and the extension portion of the connection link 33 are in sliding-contact with each other, and thus, the displacement between the connection rod 32 and the connection link 33 is attenuated, and it is possible to easily suppress the occurrence of the wear in the rotating portion by a simple configuration.

In the exhaust gas bypass device of the first embodiment, the first length L1 of the connection portion between the connection link 33 and the connection rod 32 in the longitudinal direction of the connection rod 32 is set to be longer than the second length L2 of the fixed portion between the connection link 33 and the support shaft 34 in the longitudinal direction of the connection rod 32. Accordingly, the sliding contact between the connection rod 32 and the connection link 33 occurs at a position far from the center O1 of the connection shaft 45, and thus, a frictional force generated at the sliding contact portion acts as a large moment in a rotation restriction direction, the displacement between the connection rod 32 and the connection link 33 is attenuated, and it is possible to easily suppress the occurrence of the wear in the rotating portion by a simple configuration.

In the exhaust gas bypass device of the first embodiment, when the axial thickness of the support tube 44 on which the support shaft 34 is supported is defined as L3, the radial gap between the outer peripheral surface of the support shaft 34 and the inner peripheral surface of the support tube 44 is defined as d, the axial gap of the connection shaft 45 between the connection link 33 and the connection rod 32 is defined as S, and the length of the connection link 33 from the center position O1 of the connection shaft 45 to the end portion in the longitudinal direction of the connection rod 32 is defined as L1, the following relationship is set.

$$d/L3 > S/L1$$

Accordingly, the thickness L3 of the support tube 44, the radial gap d between the support shaft 34 and the support tube 44, the axial gap S between the connection link 33 and the connection rod 32, and the length L1 from the center position O1 of the connection shaft 45 to the end portion of the connection link 33 are set to appropriate dimensions, and thus, the connection link 33 is inclined with respect to the connection rod 32, the connection rod 32 and the connection link 33 can be into sliding-contact with each other in an appropriate manner, the displacement between the connection rod 32 and the connection link 33 is attenuated, and it is possible to suppress the occurrence of the wear in the rotating portion.

In the exhaust gas bypass device of the first embodiment, the connection shaft 45 passes through the connection link 33 and the connection rod 32, the flange section 51 for retaining is fixed to the one end portion in the axial direction of the connection shaft 45, and the detachable locking pin 55 is mounted on the other end portion in the axial direction of the connection shaft 45. Accordingly, it is possible to easily assemble the connection rod 32 and the connection link 33.

Moreover, the turbocharger of the first embodiment includes the compressor 24, the turbine 25, the rotating shaft 26 which coaxially connects the compressor 24 and the turbine 25 to each other, and the exhaust gas bypass device 28. Accordingly, when the amount of the exhaust gas supplied to the turbine 25 is adjusted, and the damping member attenuates the displacement between the connection rod 32 and the connection link 33. Accordingly, the occurrence of the wear in the rotating portion between the connection rod 32 and the connection link 33 or the rotating portion of the support shaft 34 is suppressed, and thus, it is possible to accurately set opening and closing positions of the waste gate valve 35, and it is possible to improve reliability by ensuring desirable operability.

Second Embodiment

Figure 6:
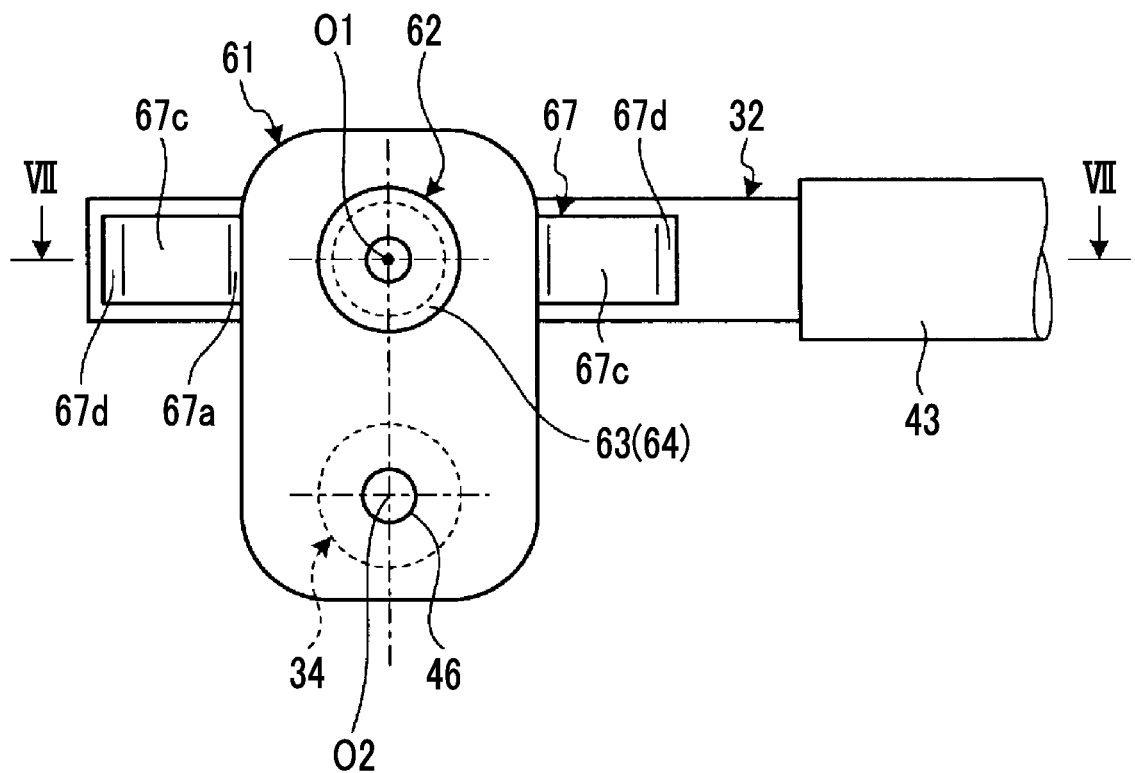
FIG. 6 is a plan view showing a connection structure of a connection link in an exhaust gas bypass device of a second embodiment.
Figure 7:
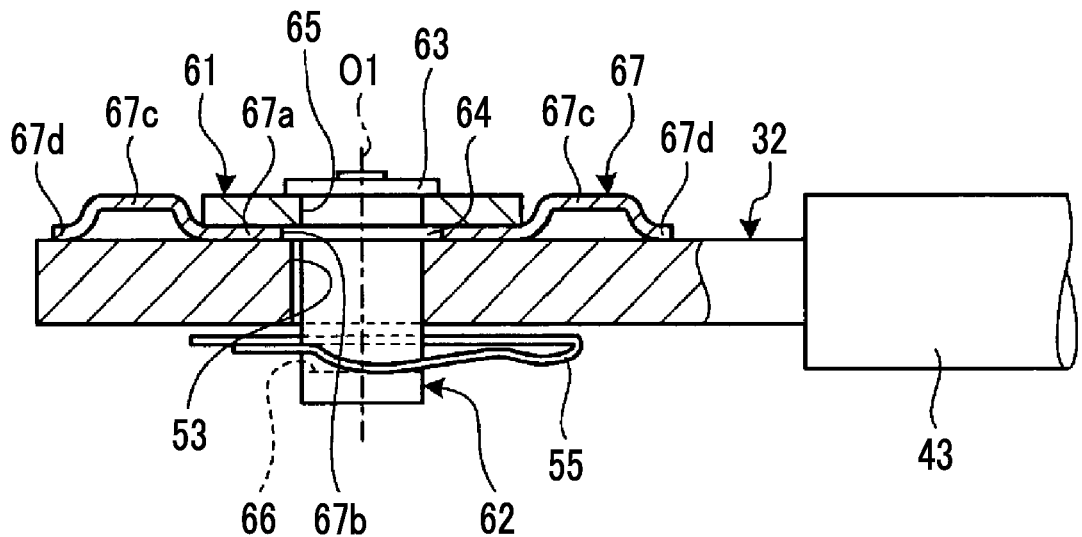
FIG. 7 is a sectional view taken along line VII-VII of FIG. 6.

FIG. 6 is a plan view showing a connection structure of a connection link in an exhaust gas bypass device of a second embodiment, and FIG. 7 is a sectional view taken along line VII-VII of FIG. 6. In addition, the same reference numbers are assigned to members having the same functions as those of the above-described embodiment, and descriptions thereof are omitted.

As shown in FIGS. 6 and 7, the exhaust gas bypass device of the second embodiment includes a damping member which attenuates a displacement between the connection rod 32 and a connection link 61. The connection link 61 has a plate thickness thinner than that of the connection rod 32 and has an elliptical plate shape in a plan view.

In addition, in a connection shaft 62, a first flange section 63 and a second flange section 64 having a circular plate shape larger than an outer diameter of the connection shaft 62 are integrally formed with each other at a predetermined interval on one end portion side in axial direction of the connection shaft 62. One end portion side of the connection shaft 62 passes through an attachment hole 65 formed in the connection link 61, and the other end portion side thereof passes through the connection hole 53 formed in the connection rod 32. In this case, the second flange section 64 is provided between the connection link 61 and the connection rod 32, and thus, a gap between the connection link 61 and the connection rod 32 is secured. In addition, a locking hole 66 penetrating the connection shaft 62 is formed on the other end portion of the connection shaft 62, and the locking pin 55 is detachably inserted into the locking hole 66. Therefore, the connection shaft 62 passes through the connection link 33 and the connection rod 32 in a state where the connection link 61 and the connection rod 32 overlap each other, the first flange section 63 is formed on the end portion of the connection shaft 62 on the connection link 61 side, the locking pin 55 is mounted on the end portion of the connection shaft 45 on the connection rod 32 side, and thus, the connection shaft 62 is assembled to be detachable. In addition, it is preferable that the first flange section 63 is formed by caulking.

In addition, a plate spring member (biasing member) 67 is interposed between the connection link 61 and the connection rod 32 as a damping member. The plate spring member 67 includes an attachment portion 67a which is provided in an intermediate portion in a longitudinal direction of the plate spring member 67 and has a flat shape, a through-hole 67b which is provided in the attachment portion 67a, elastic portions 67c which are provided on both sides of the attachment portion 67a, and sliding contact portions 67d which are provided on distal end portions of the respective elastic portions 67c. In addition, in the plate spring member 67, the second flange section 64 of the connection shaft 62 passes through the through-hole 67b between the connection link 61 and the connection rod 32, the attachment portion 67a is held by the connection link 61 and the connection rod 32, and each sliding contact portion 67d is in contact with the flat surface portion of the connection rod 32. That is, the connection link 61 and the connection rod 32 is biased and supported in a direction away from each other by an elastic force of the plate spring member 67. In this case, by setting a spring constant or a preload amount of the plate spring member 67 to an appropriate value, it is possible to always apply a stable frictional force.

Accordingly, if the connection rod 32 moves, the connection link 61 rotates about the connection shaft 62. In this case, the sliding contact portion 67d of each distal end portion of the plate spring member 67 is provided, and thus, each sliding contact portion 67d is in sliding-contact with the flat surface portion of the connection rod 32. Accordingly, a frictional resistance is generated between the connection rod 32 and the connection link 61 by the plate spring member 67, and a relative displacement between the connection rod 32 and the connection link 61 is attenuated. Therefore, an occurrence of wear between the connection rod 32, the connection link 61, and the connection shaft 62, and between the support shaft 34 and the support tube 44 is suppressed.

In this way, in the exhaust gas bypass device of the second embodiment, as the damping member which attenuates the displacement between the connection rod 32 and the connection link 61, the plate spring member 67 is interposed between the connection link 61 and the connection rod 32.

Accordingly, when the connection rod 32 and the connection link 61 relatively move to each other, the plate spring member 67 is in sliding-contact with the connection rod 32 and the connection link 61, and thus, the displacement between the connection rod 32 and the connection link 61 is attenuated, and it is possible to easily suppress the occurrence of the wear in the rotating portion by a simple configuration. In addition, it is not necessary to change a shape of the connection rod 32, the connection link 61, or the like, and thus, it is possible to suppress an increase in the cost.

Third Embodiment

Figure 8:
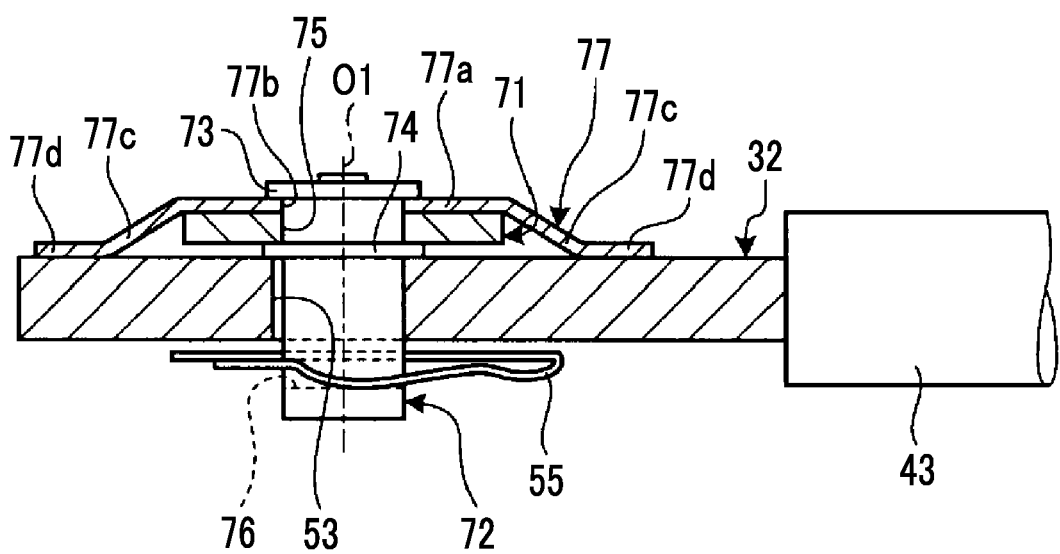
FIG. 8 is a sectional view showing a connection structure of a connection link in an exhaust gas bypass device of a third embodiment.

FIG. 8 is a sectional view showing a connection structure of a connection link in an exhaust gas bypass device of a third embodiment. In addition, the same reference numbers are assigned to members having the same functions as those of the above-described embodiments, and descriptions thereof are omitted.

As shown in FIG. 8, the exhaust gas bypass device of the third embodiment includes a damping member which attenuates a displacement between the connection rod 32 and a connection link 71. The connection link 71 has a plate thickness thinner than that of the connection rod 32 and has an elliptical plate shape in a plan view.

In addition, in a connection shaft 72, a first flange section 73 and a second flange section 74 having a circular plate shape larger than an outer diameter of the connection shaft 72 are integrally formed with each other at a predetermined interval on one end portion side in axial direction of the connection shaft 72. One end portion side of the connection shaft 72 passes through an attachment hole 75 formed in the connection link 71, and the other end portion side thereof passes through the connection hole 53 formed in the connection rod 32. In this case, the second flange section 74 is provided between the connection link 71 and the connection rod 32, and thus, a gap between the connection link 71 and the connection rod 32 is secured. In addition, a locking hole 76 penetrating in a radial direction is formed on the other end portion of the connection shaft 72, and the locking pin 55 is detachably inserted into the locking hole 76. Therefore, the connection shaft 72 passes through the connection link 71 and the connection rod 32 in a state where the connection link 71 and the connection rod 32 overlap each other, the first flange section 73 is formed on the end portion of the connection shaft 72 on the connection link 71 side, the locking pin 55 is mounted on the end portion of the connection shaft 72 on the connection rod 32 side, and thus, the connection shaft 72 is assembled to be detachable.

In addition, as a damping member, a plate spring member (biasing member) 77 is provided on a flat surface portion of the connection link 71 on a side opposite to the connection rod 32. The plate spring member 77 includes an attachment portion 77a which is provided in an intermediate portion in a longitudinal direction of the plate spring member 77 and has a flat shape, a through-hole 77b which is provided in the attachment portion 77a, elastic portions 77c which are provided on both sides of the attachment portion 77a, and sliding contact portions 77d which are provided on distal end portions of the respective elastic portions 77c. In addition, the plate spring member 77 is in contact with the flat surface portion of the connection link 71, the connection shaft 72 passes through the through-hole 77b, the attachment portion 77a is fixed to the first flange section 73, and each sliding contact portion 77d is in contact with the flat surface portion of the connection link 71. That is, the connection link 71 and the connection rod 32 is biased and supported in a direction away from each other by an elastic force of the plate spring member 77. In addition, it is preferable that the first flange section 73 is formed by caulking. In this case, by setting a spring constant or a preload amount of the plate spring member 77 to an appropriate value, it is possible to always apply a stable frictional force.

Accordingly, if the connection rod 32 moves, the connection link 71 rotates about the support shaft 34. In this case, the sliding contact portion 77d of each distal end portion of the plate spring member 77 is provided, and thus, each sliding contact portion 77d is in sliding-contact with the flat surface portion of the connection rod 32. Accordingly, a frictional resistance is generated between the connection rod 32 and the connection link 71 by the plate spring member 77, and a relative displacement between the connection rod 32 and the connection link 71 is attenuated. Therefore, an occurrence of wear between the connection rod 32, the connection link 71, and the connection shaft 72 is suppressed.

In this way, in the exhaust gas bypass device of the third embodiment, as the damping member which attenuates the displacement between the connection rod 32 and the connection link 71, the plate spring member 77 is provided on the flat surface portion of the connection link 71.

Accordingly, when the connection rod 32 and the connection link 71 relatively move to each other, the plate spring member 77 is in sliding-contact with the connection link 71, and thus, the displacement between the connection rod 32 and the connection link 71 is attenuated, and it is possible to easily suppress the occurrence of the wear in the rotating portion by a simple configuration. In addition, it is not necessary to change a shape of the connection rod 32, the connection link 71, or the like, and thus, it is possible to suppress an increase in the cost. Moreover, it is not necessary to insert the plate spring member 77 into between the connection rod 32 and the connection link 71, and thus, it is possible to improve assembling properties.

In addition, in the above-described second and third embodiments, the plate spring member is applied as the biasing member. However, the present invention is not limited to the configurations. For example, an elastic member formed of a compression coil spring, a synthetic resin, or the like may be applied.

REFERENCE SIGNS LIST

10: engine
11: engine body
13: piston
15: combustion chamber
21: intake passage
22: exhaust passage
23: turbocharger
24: compressor
25: turbine
26: rotating shaft
28: exhaust gas bypass device
29: bypass passage
30: operating passage
31: actuator
32: connection rod
33, 61, 71: connection link
34: support shaft
35: waste gate valve
41: driving rod
45, 62, 72: connection shaft
51: flange section
52, 65, 75: attachment hole
53: connection hole
55: locking pin (locking member)
63, 73: first flange section
64, 74: second flange section
67, 77: plate spring member (biasing member)

The invention claimed is:
1. An exhaust gas bypass device comprising:
an actuator which reciprocates a driving rod in an axial direction;
a connection rod which is connected to a distal end portion of the driving rod;
a support shaft which is rotatably supported by a support tube;

a connection link whose one end portion is rotatably connected to a distal end portion of the connection rod via a connection shaft and the other end portion is fixed to one end portion of the support shaft; and a waste gate valve which is connected to the other end portion of the support shaft, wherein a first length of the connection link at a connection portion between the connection link and the connection rod in a longitudinal direction of the connection rod is set to be longer than a second length of the connection link at a fixed portion between the connection link and the support shaft in the longitudinal direction of the connection rod.

2. The exhaust gas bypass device according to claim 1, further comprising:

a damping member which attenuates a displacement between the connection rod and the connection link, wherein the damping member is a biasing member which is interposed between the connection link and the connection rod and presses the connection link and the connection rod.

3. The exhaust gas bypass device according to claim 1, further comprising:

a damping member which attenuates a displacement between the connection rod and the connection link, wherein the damping member is a biasing member which is fixed to a flat surface portion of the connection link on a side opposite to the connection rod and presses the connection rod.

4. The exhaust gas bypass device according to claim 1, wherein the connection shaft passes through the connection link and the connection rod, a flange section for retaining is fixed to one end portion of the connection shaft in the axial direction, and a detachable locking member is mounted on the other end portion of the connection shaft in the axial direction.

5. A turbocharger comprising:
a compressor;
a turbine;
a rotating shaft which coaxially connects the compressor and the turbine to each other; and
the exhaust gas bypass device according to claim 1.

6. The exhaust gas bypass device according to claim 2, wherein the connection shaft passes through the connection link and the connection rod, a flange section for retaining is fixed to one end portion of the connection shaft in the axial direction, and a detachable locking member is mounted on the other end portion of the connection shaft in the axial direction.

7. The exhaust gas bypass device according to claim 3, wherein the connection shaft passes through the connection link and the connection rod, a flange section for retaining is fixed to one end portion of the connection shaft in the axial direction, and a detachable locking member is mounted on the other end portion of the connection shaft in the axial direction.

8. A turbocharger comprising:
a compressor;
a turbine;
a rotating shaft which coaxially connects the compressor and the turbine to each other; and
the exhaust gas bypass device according to claim 2.

9. A turbocharger comprising:
a compressor;
a turbine;
a rotating shaft which coaxially connects the compressor and the turbine to each other; and
the exhaust gas bypass device according to claim 3.

10. A turbocharger comprising:
a compressor;
a turbine;
a rotating shaft which coaxially connects the compressor and the turbine to each other; and
the exhaust gas bypass device according to claim 4.

11. An exhaust gas bypass device comprising:
an actuator which reciprocates a driving rod in an axial direction;
a connection rod which is connected to a distal end portion of the driving rod;
a support shaft which is rotatably supported by a support tube;
a connection link whose one end portion is rotatably connected to a distal end portion of the connection rod via a connection shaft and the other end portion is fixed to one end portion of the support shaft; and
a waste gate valve which is connected to the other end portion of the support shaft,
wherein when an axial length of the support tube is defined as L3, a radial gap between an outer peripheral surface of the support shaft and an inner surface of the support tube is defined as d, an axial gap of the connection shaft between the connection link and the connection rod is defined as S, and a length of the connection link from a center position of the connection shaft to an end portion in a longitudinal direction of the connection rod is defined as L1, $d/L3 > S/L1$ is satisfied.

12. The exhaust gas bypass device according to claim 11, further comprising:

a damping member which attenuates a displacement between the connection rod and the connection link, wherein the damping member is a biasing member which is interposed between the connection link and the connection rod and presses the connection link and the connection rod.

13. The exhaust gas bypass device according to claim 11, further comprising:

a damping member which attenuates a displacement between the connection rod and the connection link, wherein the damping member is a biasing member which is fixed to a flat surface portion of the connection link on a side opposite to the connection rod and presses the connection rod.

14. The exhaust gas bypass device according to claim 11, wherein the connection shaft passes through the connection link and the connection rod, a flange section for retaining is fixed to one end portion of the connection shaft in the axial direction, and a detachable locking member is mounted on the other end portion of the connection shaft in the axial direction.

15. A turbocharger comprising:
a compressor;
a turbine;
a rotating shaft which coaxially connects the compressor and the turbine to each other; and
the exhaust gas bypass device according to claim 11.

* * * * *